Oct. 19, 1943.  G. L. DOROUGH ET AL  2,332,373
FLEXIBLE TRANSPARENT SHEET MATERIAL
Filed March 3, 1942
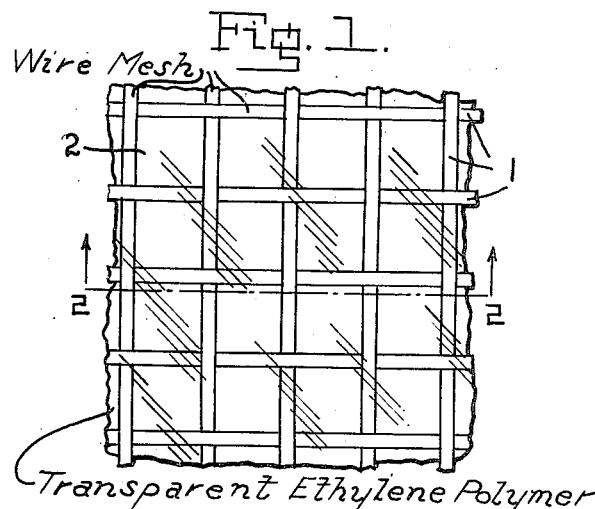
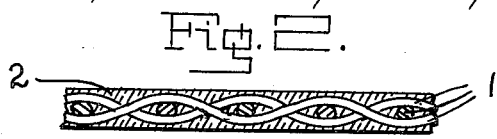
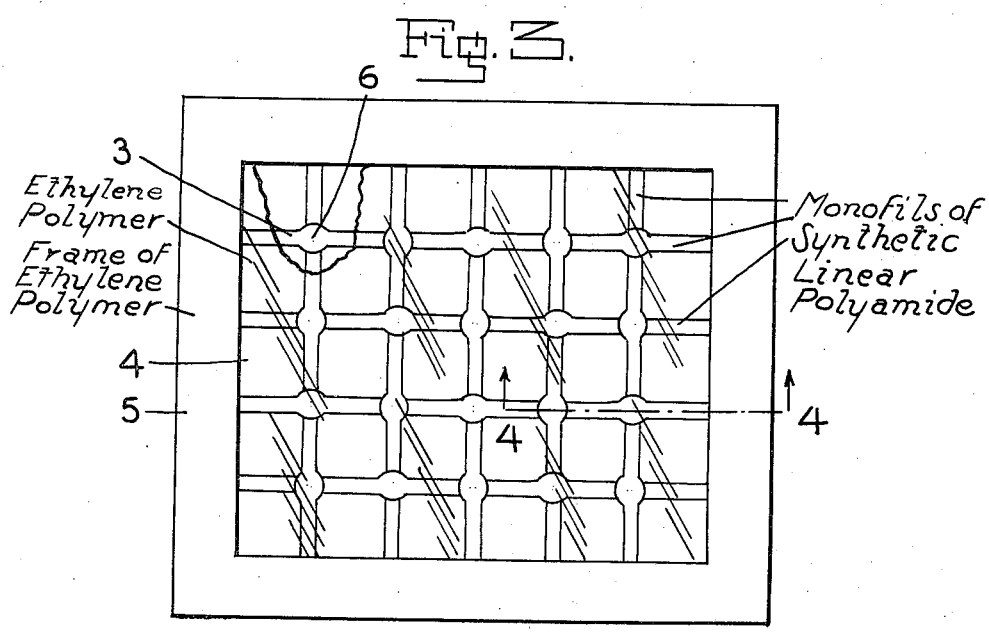
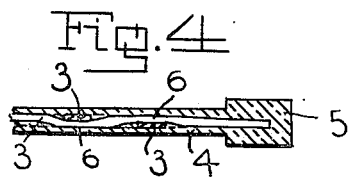
INVENTORS
George L. Dorough
George H. Latham
BY
R. F. Miller ATTORNEY.

Patented Oct. 19, 1943

2,332,373

UNITED STATES PATENT OFFICE 2,332,373

FLEXIBLE TRANSPARENT SHEET MATERIAL

George L. Dorough, Niagara Falls, N. Y., and George H. Latham, Wilmington, Del., assignors to E. I. du Pont de Nemours & Company, Wilmington, Del., a corporation of Delaware Application March 3, 1942, Serial No. 433,202

2 Claims. (Cl. 117—98)

This invention relates to transparent flexible sheet material and more particularly to a product of this kind composed of a reticulated or mesh support and a transparent, strongly adherent, continuous coating.

This invention has as an object to provide an improved self-supporting, pliable, transparent, supported sheet material which is highly resistant to degradation on outdoor exposure and to the corrosive action of acids and alkalis at normal and at elevated temperatures. A further object is the manufacture of flexible sheet materials of this type which are transparent to ultra-violet light even after extended outdoor exposure. Other objects will appear hereinafter.

The above objects are accomplished by embedding in a film of the normally solid ethylene polymer more particularly described hereinafter a reticulated supporting structure consisting of a flexible screen having a mesh of such size that the breadth of the interstices between the filaments from which the screen is made is at least equal to the diameter of the filaments. The improved product obtained in accordance with this invention comprises the mentioned mesh supporting structure and a continuous strongly adherent film of the transparent ethylene polymer.

In the accompanying drawing

Fig. 1 is a plan view of the product of this invention;

Fig. 2 is a section through Fig. 1;

Fig. 3 is a plan view of a further form of the invention; and

Fig. 4 is a section through Fig. 3.

In Figures 1 and 2 the numeral 1 indicates wire mesh screen in which the strands are of oval cross section and in which the size of the mesh is about the size of the filament from which the mesh is made. The filaments forming the screen are completely covered or enveloped by a continuous film of the hereinafter described ethylene polymer which closes the mesh and provides a flexible coating possessing essentially the transparency of the screen base.

In Figure 3 the strands forming the mesh screen are composed of synthetic linear polyamide filaments which can be secured at the points of intersection through application of a solvent at the point of contact or by fusion. The filaments 3 are desirably partly flattened at the point of crossing 6, by rolling the screen base under high pressure until the thickness at the point of crossing is about the same as that of the single filament. The screens of this invention, depending on the purpose, can be used with or without a frame. In Figures 3 and 4 the ethylene polymer covered polyamide screen is embedded in a bead or frame of the ethylene polymer.

The solid ethylene polymers which are used in the improved transparent flexible sheet materials of this invention are made by heating ethylene alone as described in United States Patents 2,153,553 and 2,188,465 or in admixture with another polymerizable unsaturated organic compound as described in United States Patent 2,200,429. The polymers of ethylene alone or in admixture with other polymerizable organic compounds can also be obtained by contacting ethylene alone or in admixture with other polymerizable organic compounds with water and a per-compound catalyst, perferably a diacyl peroxide, at temperatures of from 40° to 350° C. and at pressures in excess of atmospheric, preferably in the range of 50 to 1500 atmospheres. The polymers of ethylene alone are solid at normal temperatures, correspond in composition substantially to $(CH_2)_x$, and have molecular weights above 6000. The properties of the polymers of ethylene with other polymerizable organic compounds depend upon the composition of the polymer and the nature of the polymerizable unsaturated organic compound.

In the preferred method of carrying out the invention the mesh base is coated by passing it through a solution of the polymer and then heating the coated material above or at least at the melting point of the polymer, after which the polymer is rapidly cooled by drowning in cold water.

The invention is further illustrated by the following examples:

Example I

Strips of standard 15 to 16 mesh galvanized iron wire screen, composed of oval wires, 4″ wide and 30″ long are dipped in a 25% xylene solution of an ethylene polymer having a molecular weight of about 20,000. The solution is held at 100° C. and the screen permitted to stay in the solution for ½ hour. The screen is withdrawn, drained, and allowed to stand at 100° C. for an hour to remove the solvent. The coated screen is then heated at 100° C. for 10 minutes and then plunged into cold water. The resulting coated screen is highly transparent, especially to ultraviolet light.

Example II

By a procedure similar to that of the above example, a flexible transparent sheeting is prepared by replacing the metallic screen with one fabricated from monofils composed of a superpolymer obtained by reacting hexamethylenediamine with adipic acid as described in United States Patent 2,130,948. The sheeting obtained in accordance with this procedure is very tough, highly elastic, and unusually transparent.

Example III

To a wire screen support similar to that of Example I is applied a 20 mils thick film of the polymer obtained by polymerizing ethylene with vinyl acetate in the proportion of 14 parts of ethylene and 1 part of vinyl acetate as described in the application of Merlin M. Brubaker, Serial No. 383,556. The superimposed layers of screen and film are pressed between plates of an electrically heated hydraulic press at 150° C. The product is a transparent sheeting which is resistant to flexing.

*Example IV*

A mesh screen of woven copper wires is passed through a 40% toluene solution of an ethylene polymer of molecular weight about 10,000 prepared by heating ethylene at 210° C. under 1500 atmospheres pressure as described in United States Patent 2,153,553. The solvent is evaporated from the treated article by the procedure described in Example I, leaving a tough, flexible, coated material having a wire mesh base. After long exposure to the weather the coating is found to cling tenaciously to the wire base and to be free of any evidences of deterioration. The inertness of the product to chemical agents and its waterproofness makes this coated screen unique.

In other methods of applying the ethylene polymer to the screen, the polymer in the form of a powder can be applied in a uniform layer to the base material and the assembly heated above the melting point of the polymer. The mesh base can also be passed through an aqueous dispersion of the polymer or through a batch of the fused polymer.

The base material used in the practice of this invention can be composed of any reticulated structure composed of suitably arranged strands presenting discrete openings. The mesh base material of this kind can, for example, be composed of polyamide filaments suitably crossed as to provide a mesh of the size usually found in wire mesh screens. These filaments can be woven from strands containing a plurality of single filaments prepared by extrusion of the high molecular weight synthetic linear polyamides described in United States Patents 2,071,253 and 2,130,948. The screen can also be fabricated from copper, iron, or suitable alloys which may be galvanized or otherwise chemically treated by any of the methods known in the fabrication of wire meshes. In order that the wire fabric be coated uniformly it is essential that it be fabricated in such a way as to eliminate crinkling at the points of contact of the individual wires. The individual filaments from which the mesh screen is fabricated can be round or flat but the best results are obtained with oval filaments, particularly in the case of wire mesh materials.

The reticulated mesh bases used in the practice of this invention can be woven from filaments of from 7 to 20 mils in diameter, if a reasonably rigid self-supporting structure is desired, or from filaments of as high as 60 mils or higher diameter if an unusually rigid structure is desired. If structures which are to be used in conjunction with a frame are desired, then filaments as low as 2 to 3 mils in diameter can be used in weaving the mesh base. In general, the breadth of the interstices in the screen should be no less than the diameter of the filaments from which the screen is made. The upper limit of the size of the voids in the screen depends in part on the method which is to be used in the application of the continuous ethylene polymer coating. If the coating is to be applied from solution, dispersions, or melts, then screens having smaller voids are employed than when the coating is to be applied in the form of preformed films as in Example III.

The ethylene polymers mentioned herein include any of the polymers which are solid at temperatures above 100° C., which contain the ethylene constituent in substantial proportions, and which are obtained by any one of the methods described in the above mentioned patents and patent application by polymerizing ethylene alone or admixed with at least one other polymerizable unsaturated organic compound such as for example, 1,2-dichloroethylene, 2-chloropropene, tetrafluoroethylene, etc.; vinyl ethers, ketones, or esters or other vinyl compounds, e. g., methyl vinyl ether, methyl and ethyl vinyl ketones, vinyl chloroacetate, vinyl propionate, N-vinyl phthalimide, vinyl thiol acetate, etc.; stilbene, propylene, butylene, etc.; acrylic and methacrylic acids and their derivatives such as for example the esters, amides and imides; maleic acid and its esters, and itaconic acid and its esters.

The term polymer as used herein refers to the products obtained by polymerizing ethylene alone or in admixture with at least one other polymerizable organic compound by any one of the methods disclosed in the hereinabove mentioned patents and patent application.

The products of this invention have a high degree of transparency to ultra-violet light and are particularly valuable as glass substitutes in applications where this property is a prime requisite along with flexibility and long life on outdoor exposure. Thus, the products are useful in the construction of enclosures where light diffusion and heat insulating properties are important factors such as in greenhouses, hot beds, cold frames, poultry houses, chicken coops, and the like. The products of this invention possess to a greater degree than the products heretofore available the qualities of flexibility at normal and at extremely low temperatures such as −10° C., toughness, weatherproofness, lightness of weight, etc., besides being more conductive of heat, transparent and capable of diffusing transmitted light.

As many apparently widely differing embodiments of this invention may be made without departing from the spirit and scope thereof, it is to be understood that this invention is not limited to the specific embodiment thereof except as defined in the appended claims.

We claim:

1. In the manufacture of flexible, transparent, self-supporting sheet material having a reticulated base embedded within a transparent film, the steps comprising applying to a reticulated open mesh base composed of monofils of synthetic linear polyamide a continuous coating of a film of a solid polymer of ethylene, heating the coated product to a temperature of at least substantially that of the melting point of the polymer, and then rapidly cooling the coated mesh base by quenching it in a cooling liquid.

2. An article of manufacture comprising a self-supporting, flexible transparent sheet material obtained by the process set forth in claim 1.

GEORGE L. DOROUGH.
GEORGE H. LATHAM.